Sept. 22, 1936.   N. FERRAEZ, JR   2,055,252
APPARATUS FOR COLLECTING AND TESTING SEDIMENTS OF LIQUIDS
Filed July 18, 1931   3 Sheets-Sheet 1

Inventor:
Nicolas Ferraez Jr.
By Herbert G. Fletcher
atty.

Sept. 22, 1936.  N. FERRAEZ, JR  2,055,252
APPARATUS FOR COLLECTING AND TESTING SEDIMENTS OF LIQUIDS
Filed July 18, 1931  3 Sheets-Sheet 2
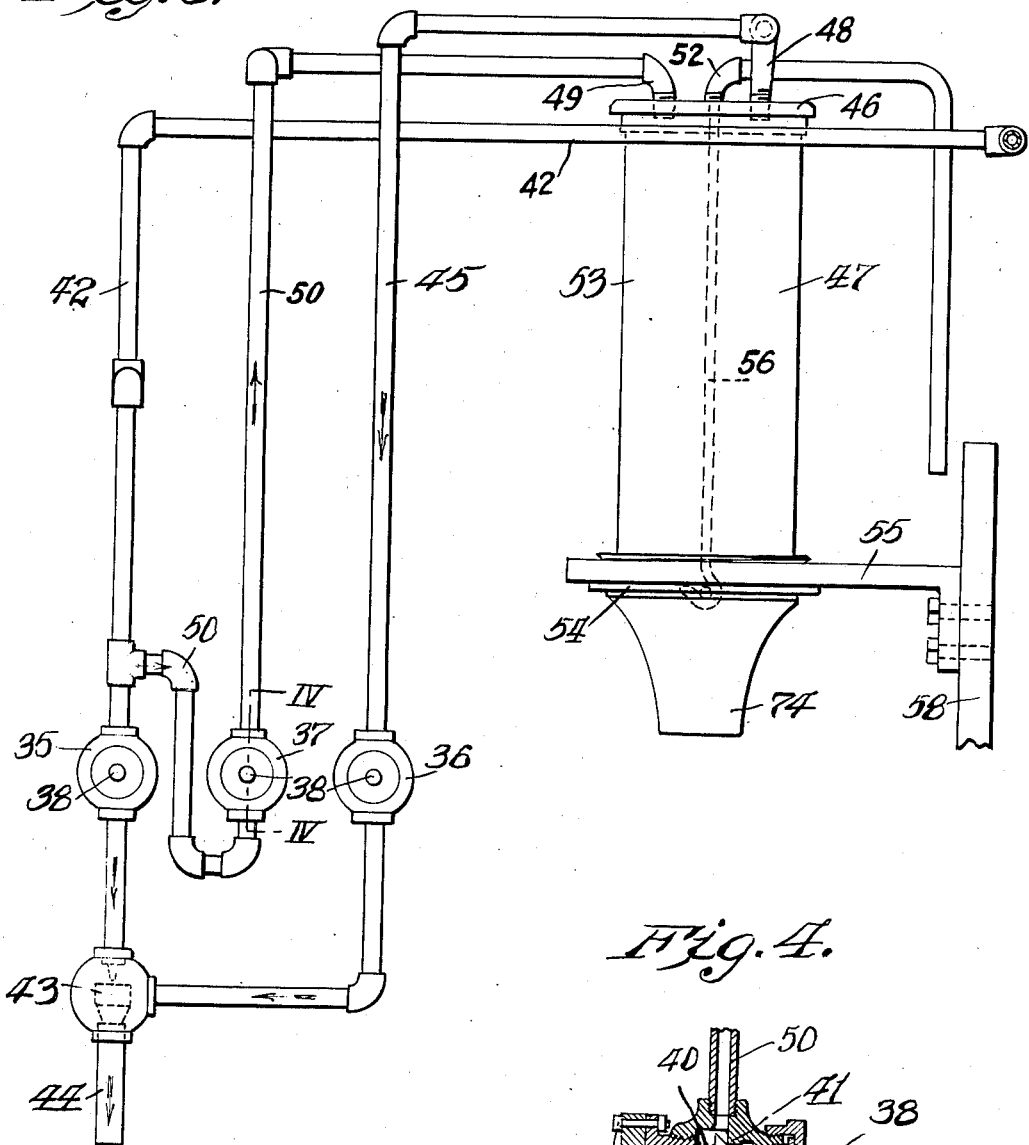
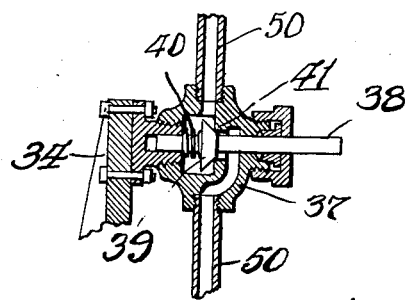

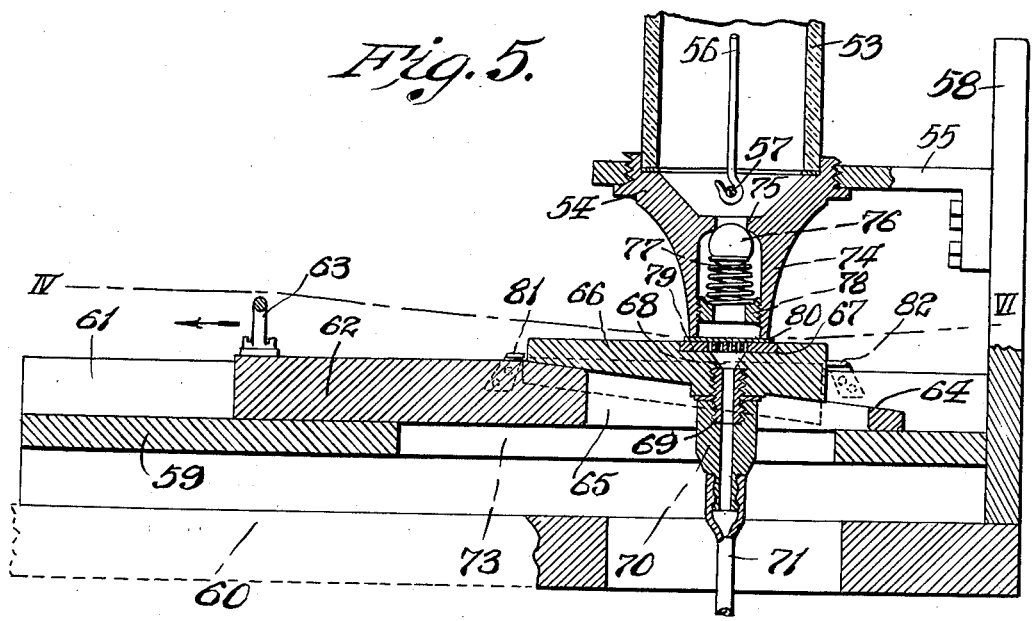
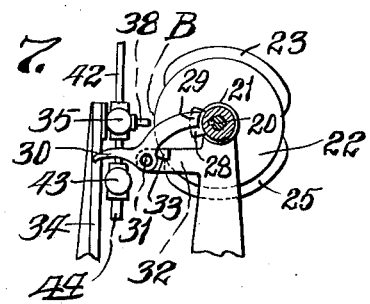
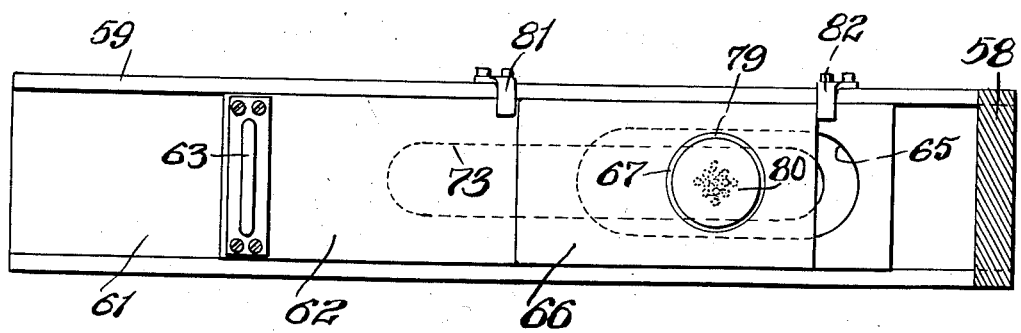

Patented Sept. 22, 1936

2,055,252

UNITED STATES PATENT OFFICE 2,055,252

APPARATUS FOR COLLECTING AND TESTING SEDIMENTS OR LIQUIDS

Nicolas Ferraez, Jr., Highland, Ill.

Application July 18, 1931, Serial No. 551,734

10 Claims. (Cl. 73—51)

This invention relates to improvements in apparatus for collecting and testing sediments of liquids such as milk and has for its primary object to provide an improved apparatus for acting on a measured quantity of liquid and collecting the sediment thereof for determining the foreign matters in the liquid.

Another object of the invention is in providing an improved apparatus for more expeditely handling and acting on liquid quantities for testing purposes.

A further object of the invention is in providing improved apparatuses for acting on liquid quantities to be tested by collecting sediments or foreign matters therefrom in one cycle of operation, including the entraining of a measured liquid quantity into a container and of forcing the liquid quantity from the container through a collecting disc.

Still another object of the invention is in employing a compressed air agency as a part of the apparatus for carrying on the entraining to and expelling from a container a measured quantity of liquid for collecting the sediment therefrom.

A still further object of the invention is in providing an improved combination of devices which are automatically operated in each cycle of operation for acting on a liquid quantity for collecting the sediments therefrom.

Other and further objects will appear in the specification and be specifically pointed out in the appended claims, reference being had to the accompanying drawings, exemplifying the invention, and in which:—

Figure 3 is an enlarged transverse elevation taken approximately on the line III—III of Fig. 1.

Figure 4 is an enlarged fragmentary vertical section taken approximately on the line IV—IV of Fig. 3 through one of the mechanically actuated control valves.

Figure 5 is an enlarged longitudinal vertical section taken approximately on the line V—V of Fig. 2.

Figure 6 is an enlarged horizontal section taken approximately on the line VI—VI of Fig. 5.

Figure 7 is a fragmentary vertical section taken approximately on the line VII—VII of Fig. 1.

Figure 1:
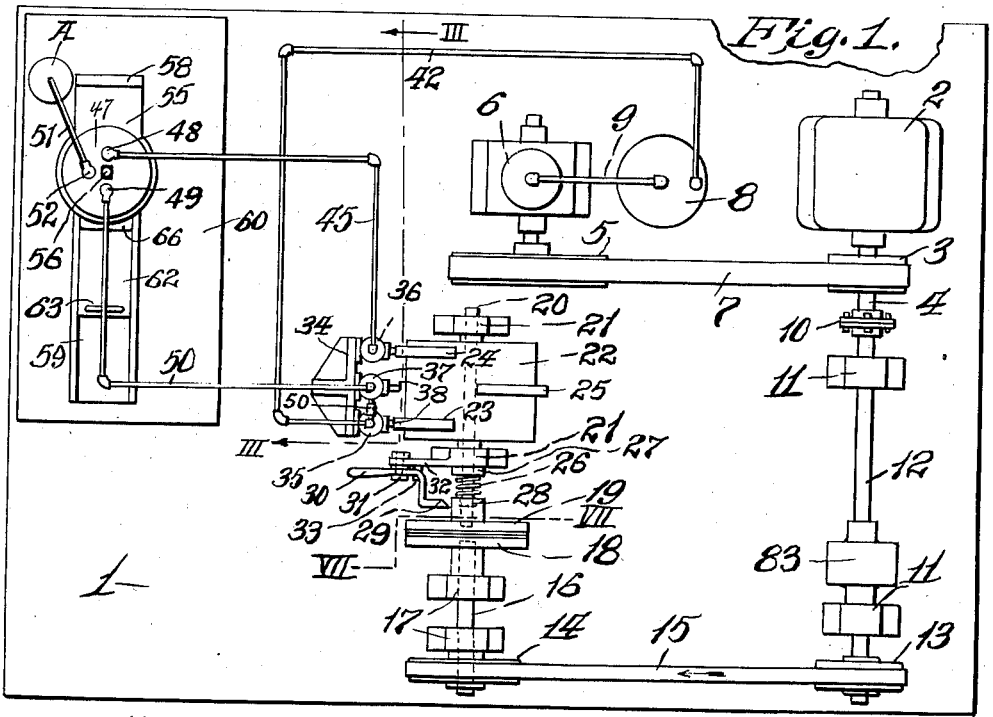
Figure 1 is a plan view of the apparatuses used in carrying out the invention.
Figure 2:
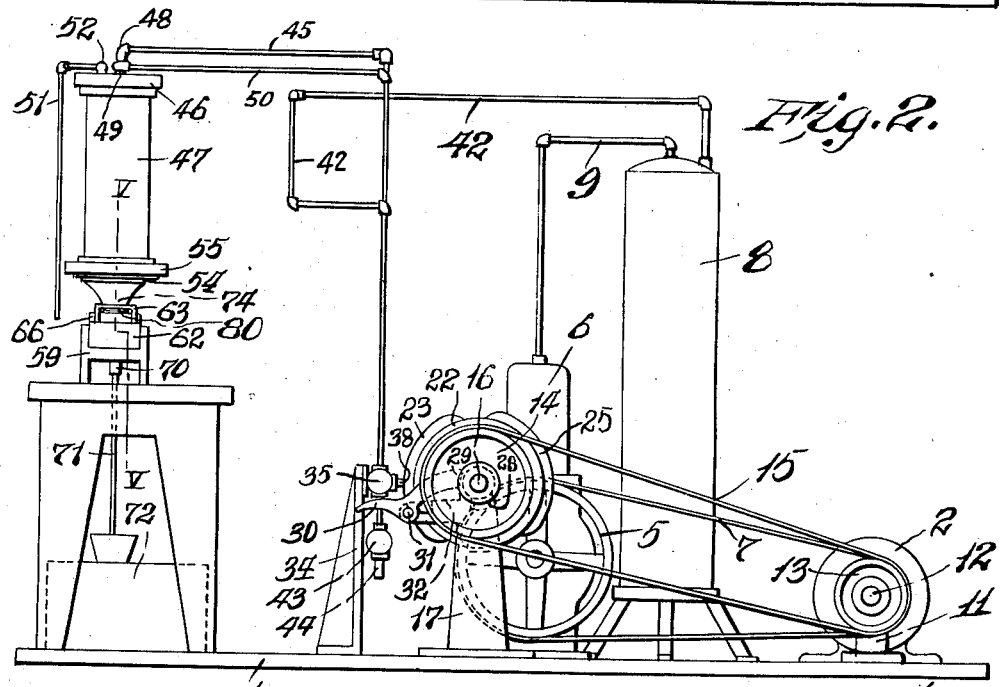
Figure 2 is a side elevation of Fig. 1.

Referring by numerals to the accompanying drawings, I designates a base on which all of the operating elements used in carrying out the invention may be mounted, the numeral 2 designating a motor having the drive pulley 3 fixedly secured on the motor shaft 4 and mounted on said pulley and the pulley 5 of an air compressor 6 is a belt 7, the motor 2 being adapted to operate the compressor 6 and the compressor discharging the compressed air into a storage tank 8 through the pipe 9.

Secured in horizontal alinement with the motor shaft 4 by the securing flanges 10 and supported in bearings 11 is a drive shaft 12 and secured on the extending end of the shaft 12 is a pulley 13 which is adapted to drive the pulley 14 by the belt 15, said pulley 14 being mounted on the end of the driven shaft 16 which is supported in bearings 17 and secured to the opposite end of the shaft 16 is a driving disc 18.

For cooperation with the driving disc 18 is a clutch disc 19 which is keyed but slidably mounted on a shaft 20, said shaft being in horizontal alinement with the shaft 16 and supported in bearings 21 and fixed to said shaft 20 between the bearings 21 is a member 22 having an identical pair of spaced, like positioned, cam surfaces 23 and 24, and disposed on said member 22 in a travelling position intermediate of the cam surfaces 23 and 24 is a cam surface 25.

The clutch or friction disc 19 is provided with a hub and bearing endwise against said hub is a coil spring 26, said spring being mounted on the shaft 20 and abutting a collar 27 fixed to said shaft and mounted on the hub of the clutch disc 19 is a cam lug 28 and for cooperation with said cam lug is the beveled end 29 of a lever 30 which is pivoted at 31 to an arm 32 which is extended from the shaft bearing 21 against which the collar 27 of said shaft abuts. A resting stop 33 is extended from the arm 32 for underengagement with the lever 30.

Disposed on one side of the cam carrying member 22 is a standard 34, said standard supporting three control valves 35, 36 and 37, said control valves being disposed in the same horizontal plane and the valve 37 being disposed intermediate of the valves 35, and 36, each valve being disposed in alinement with a respective cam surface 23, 24 and 25 of the member 22 so that the cam surfaces 23, 24 and 25 will in their travel engage and press inward a valve stem 38 of respective control valves 35, 36 and 37 for operating said valves to open positions.

The control valves 35, 36 and 37 are alike and for detailed construction, reference is made to Fig. 4 in which the valve stem 38 is provided with a valve 39 and a spring 40 for keeping the valve normally on the seat 41.

Leading from the air storage tank 8 to the control valve 35 is a pipe line 42 and continuing from said valve and connected with said pipe line is an ejector 43 having a discharge end 44 and leading from one side of said ejector is a pipe line 45 in which the control valve 36 is located, said pipe line continuing upwardly from the valve 36 and connecting with the cylinder head 46 of a container 47 through an elbow 48. Connected with the cylinder head 46 is an elbow 49 and leading from said elbow is a pipe line 50 which is connected to and is in communication with the control valve 37, said pipe line also leading from the valve 37 and connecting with the pipe line 42, ahead or forwardly of the valve 35 as shown in Fig. 3.

Extending from the cylinder head 46 of the container 47 is a suction pipe 51 having communication with the container 47 through the check valve 52, said pipe 51 providing for the entrainment of liquid into the container from a receptacle such as shown at A in Fig. 1.

The container 47 comprises a tubular glass body 53 which is closed at its ends by the upper cylinder head 46 and the lower cylinder head 54, the cylinder head 54 being threadingly secured to a supporting bracket 55 and the glass tube or cylinder 53 being securely held in position by the tie rod 56 which is secured at its lower end to a cross pin 57 borne by the cylinder head 54 and said tie rod bearing a nut for clamping the cylinder heads 46 and 54 tightly against the end disposed gaskets of the glass tube 53.

The bracket 55 is secured to a portion 58 which extends from one end of a horizontally disposed member 59 which is mounted on the table 60, said member 59 having a horizontally disposed and longitudinally extending guideway 61 formed therein and slidably mounted in said guideway is a wedge block 62 having a handle 63 for engaging and sliding the wedge block.

The wedge block 62 is provided with an inclined surface 64 and formed in said wedge block is a vertically extending longitudinally disposed aperture 65 and mounted on the inclined surface 64 of said wedge block is an auxiliary wedge block 66 having an inclined under surface in conformity to the inclined surface 64 of the wedge block 62 and a horizontal upper surface and formed in the upper surface of the block 66 is a countersink 67. Concentrically formed in the countersink 67 is a vertical opening 68 extending through the block 66 and secured in said opening from the under side of the block 66 is a nipple 69 and secured to and depended from the extending end of said nipple is a hose connection 70 having a hose 71 depended therefrom, said hose leading to a receiving receptacle 72. The hose connection 70 extends into the aperture 65 of the block 62 and through a longitudinal opening 73 formed in the member 59.

The lower cylinder head 54 of the container 47 is provided with a funneled depending spout 74 and mounted in said spout is a valve seat 75 for a ball check 76, said ball check being held against said seat by the spring 77, said spring being held in position by the threaded spring seat 78 which is inserted in the spout 74 of the cylinder head 54.

Mounted in the countersink 67 of the auxiliary wedge block 66 is a perforated plate 79, said plate being for the reception of a sediment test disc 80 which is placed on the plate 79 for collecting the sediment from the quantity of liquid when liquid from the container 47 is forced therethrough.

Figure 5 indicates the wedging positions of the wedge blocks 62 and 66 for holding the disc 80 in tightly secured position against the end of the spout 74 of the container 47, the disc 80 being placed on the plate 79 when the auxiliary wedge block 66 is in released position. In releasing the wedge 66 from wedging position, the handle 63 of the wedge 62 is engaged and the wedge is pulled in the direction of the arrow shown in Fig. 5 and while the wedge 62 is being withdrawn, the wedge 66 will be withheld from being carried by the block 62 by reason of the rear end of the block 66 engaging the stop 81 which is secured to one side of the member 59, said block 66 however lowering itself by gravity from its wedged position to the position shown by dotted lines (Fig. 5) as the inclined surface 64 of the wedge 62 is moved thereunder. In this lowered position the said block 66 can then be withdrawn beneath the stop 81 by the block 62 so that the disc 80 can be mounted in place or removed from the plate 79. The wedge 66 is returned to its wedging position by moving the block 62 forwardly in its guideway 61, the inclined surface 64 of the block 62 forcing the block 66 upwardly as the block 66 is prevented from being carried forwardly by reason of its front end engaging the stop 82 and obviously the disc 80 on the plate 79 will be tightly jammed against the spout 74 of the container 47.

In the operation of this improved apparatus, when the motor 2 is placed into operation, the compressor 6 will be put into motion and an air pressure will be maintained in the tank 8 and the drive shaft 12 of the motor through the speed reduction device 83 will operate the shaft 16 through the belt 15, the clutch disc 19 on the shaft 20 however being normally disengaged from the disc 18 by engagement of the end 29 of the lever 30 with the cam lug 28 on the hub of the clutch disc 19.

In testing liquids such as milk for their sediment content, a receptacle A containing milk to be tested is engaged so as to be acted on by the end of the suction pipe 51 so that the content of the receptacle can be drawn into the container 47.

Assuming that a sediment test disc 80 has been wedged into closing position with the spout 74 of the container 47, the lever 30 is engaged and operated so that the end 29 will release the cam lug 28 on the hub of the clutch disc 19 and the coil spring 26 will force the clutch disc 19 into frictional engagement with the driving disc 18 of the shaft 16, the shaft 16 then imparting rotary motion to the shaft 20. The rotating of the shaft 20 will carry the member 22 and cause the cam surfaces 23 and 24 to simultaneously engage respective valve stems 38 of the control valves 35 and 36 thereby opening said valves and causing air to be discharged through the pipe line 42 from the tank 8 into the ejector 43, the operating of the ejector creating a suction in the pipe line 45 through the control valve 36, and air will be withdrawn from the container 47 thereby causing a partial vacuum therein. The partial vacuum in the container 47 will unseat the check valve 52 and a suction will be created in the pipe 51 thereby drawing the liquid from the receptacle A into the container 47.

During the revolving of the member 22 carrying the cam surfaces 23, 24 and 25, soon after the cam surfaces 23 and 24 disengage their respective valve stems 38 of the control valves 35 and 36, (at which time the valves 35 and 36 will be closed by the springs 40 of respective valve stems 38) the cam surface 25 will engage and inwardly press the valve stem 38 of the control valve 37 thereby unseating the valve 39 of said valve stem from its seat 41 and permitting air pressure to be entrained therethrough from the pipe line 42 through the pipe line 50, thereby applying an air pressure on the liquid in the container 47 and forcing the liquid downwardly through the container where the ball check 76 will be forced from its seat 75 and the liquid will be forced through the sediment test disc 80, through the hose connection 70 and hose 71 to the receiving receptacle 72, the sediment test disc 80 which is composed of a cotton or other fibrous material retaining the sediment or foreign matter of the liquid.

Obviously after the cam surface 25 has released the valve stem 38 of the control valve 37, the member 22 on the shaft 20 will have made approximately one revolution from the time when the cam surfaces 23 and 24 simultaneously engage respective valve stems 38 of the control valves 35 and 36, therefore the intermediate space B on the periphery of the member 22 between the ends of the cam surfaces 23, 24 and the cam surface 25 will be adjacent and in horizontal alinement with all of the valve stems 38 and in which position the cam lug 28 of the clutch disc 19 is in engagement with the beveled end 29 of the lever 30, this engagement of the lug with the lever 30 drawing and holding the clutch disc 19 away from the driving disc 18 and in which position the shaft 20 and member 22 thereon is stopped from further rotation.

After the sediment has been collected from the quantity of liquid discharged from the container 47, the wedge block 66 is released by withdrawing the wedge block 62 as before described and the disc 80 which is loaded with the sediment is removed and mounted on an indicating card by slapping it on the card and permitting it to dry, then an inspection, microscopic or otherwise, is made to determine of what the sediment consists such as foreign matters which may consist of dust, dirt, or other by-products and in the instance of testing milk, disease germs may be detected.

In a device of this character, when in operation, numerous tests are intermittently made of different liquid quantities, a new disc of course being inserted in the countersink or seat 67 for having each liquid quantity forced through for collecting the sediment of different liquid quantities in respective test discs. Therefore, as each disc is mounted in place by securely wedging it against the spout 74 of the container 47, the lever 30 is operated to swing the beveled end 29 upwardly out of engagement with the stop lug 28 and as the shaft 16 is continually operating, the spring 26 will force the clutch disc 19 against the driving disc 18 for turning the member 22 one revolution for first operating the cam surfaces 23 and 24 for opening the control valves 35 and 36 and subsequently operating the cam surface 25 to open the control valve 37, thus completing an operation for detraining the container 47 of air and entraining the liquid quantity into the container and finally to provide an inrush of compressed air to force the liquid body from the container and through the sediment test disc 80 for loading it or causing it to collect the foreign matters from the liquid body.

From the aforesaid description of this invention, it is obvious that but one cycle of operation is required to entrain and collect the sediment from a quantity of liquid and that after the member 22 has been set in motion, the operation of the different mechanisms is automatic in completing the cycle of operation.

Obviously constructional modifications of the device are possible without departing from the spirit of the present invention and therefore it is to be understood that it is not necessary to limit the invention by the terms used in the foregoing description, excepting such as the state of the art may require.

What I claim is:—

1. A sediment tester comprising a container having an inlet and a discharge end, a porous element placed at the discharge end of the container, a tube connected to said container, means connected to said tube for inducing a vacuum in said container for entraining liquid therein through the inlet thereof, a second tube connected to said container, and means connected to said second tube for inducing pressure in said container for discharging the liquid from the discharge end thereof through said element.

2. A sediment tester comprising a container having an inlet opening and a discharge end; a porous element placed at the discharge end of the container; a tube connected to said container, suction inducing means including a control valve connected to said tube, means for operating said valve for inducing a vacuum in said tube for entraining a supply of liquid into the container through the inlet opening thereof; a second tube connected to said container, pressure producing means including a control valve connected to said second tube, and means for operating said second control valve for inducing a pressure in said container for discharging the liquid from the discharge end of the container through said porous element.

3. A sediment tester comprising a container having an inlet end and a discharge end, a porous disc inserted at the discharge end of said container, removable wedging means for tightly holding said disc against said discharge end, means for inducing vacuum in said container for drawing a liquid quantity therein through the inlet end, and means for inducing pressure in said container for discharging the liquid through the discharge end and through said disc.

4. An apparatus for collecting the sediment from liquids comprising a container having an inlet end and a discharge end, a porous element tightly engaged against the discharge end of the container, a tube connected to said container, an ejector connected to said tube for inducing a vacuum in said container for entraining a supply of liquid in said container through the inlet end, a second tube connected to said container, and means connected to said second tube for inducing pressure in said container for discharging the liquid from the discharge end thereof through said element.

5. A sediment tester comprising a container having an inlet end and a discharge end, a porous element at the discharge end of the container, a pressure supply source, an ejector, a tube connected to said pressure source and said ejector, a second tube connected to said container and said ejector, a branch tube connected to said first tube and said container, a control valve for each respective tube, means for simultaneously actuating the control valves of said first tube and said second tube for inducing vacuum in said container for entraining a supply of liquid therein through the inlet end, and other means for subsequently actuating the control valve of said branch tube for inducing pressure in said container for discharging the liquid from the discharge end thereof through said element.

6. An apparatus for collecting the sediment from liquids comprising a container having an inlet end and a discharge end, a porous disc placed at the discharge end of said container, a wedge member on which said disc is seated, a second wedge member cooperable with said first wedge member for abutting the disc against the discharge end of said container, means for inducing vacuum in said container for drawing a liquid quantity therein through the inlet end thereof, and other means for inducing pressure in said container for discharging the liquid therefrom through said disc.

7. A device for testing liquid comprising a container having an inlet passageway and a discharge passageway, a porous element positioned across the discharge passageway, timed mechanical means operable to induce vacuum into said container for drawing a liquid quantity therein through the inlet passageway, and other timed mechanical means operable to induce pressure on the entrained liquid for forcing the liquid through said element from the discharge passageway.

8. A device for testing liquids comprising a container having an inlet end and a discharge end, a porous element positioned at the discharge end of said container, means for tightly holding said element against said discharge end, timed mechanical means operable to entrain fluid into said container through the inlet end thereof, and other timed mechanical means operable to expel the entrained fluid through said porous element.

9. A sediment tester comprising a container having a porous disc inserted at its discharge end, timed mechanically operable means for inducing vacuum in the container for drawing a liquid quantity therein, and other timed mechanical means for inducing pressure in the container for discharging the liquid therefrom through said disc.

10. A sediment tester comprising a container having an inlet end and a discharge end, a porous disc inserted at the discharge end of the container, means for tightly holding said disc against the container discharge end, means for inducing vacuum in said container for drawing liquid therein through the inlet end thereof, and means for inducing pressure in said container for discharging the drawn in liquid through the discharge end and said disc, both of said inducing means including timed mechanically operating mechanisms.

NICOLAS FERRAEZ, Jr.